United States Patent
Cheong et al.

(10) Patent No.: US 7,301,950 B1
(45) Date of Patent: Nov. 27, 2007

(54) ADAPTIVE STATE TRANSITION CONTROL

(75) Inventors: Yoon Chae Cheong, Kanata (CA); Gamini Senarath, Nepean (CA); Hang Zhang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1039 days.

(21) Appl. No.: 10/075,436

(22) Filed: Feb. 14, 2002

(51) Int. Cl.
*H04L 12/28* (2006.01)
*H04L 12/56* (2006.01)
*H04L 1/00* (2006.01)
*H04L 12/26* (2006.01)
*H04B 7/00* (2006.01)

(52) U.S. Cl. .............. 370/395.21; 370/252; 370/310; 370/395.4; 370/431

(58) Field of Classification Search ............. 370/252, 370/310, 395.21, 395.4, 431
See application file for complete search history.

(56) References Cited

U.S. PATENT DOCUMENTS

| | | | |
|---|---|---|---|
| 6,243,579 B1 * | 6/2001 | Kari | 455/426.1 |
| 6,501,741 B1 * | 12/2002 | Mikkonen et al. | 370/310 |
| 6,879,561 B1 * | 4/2005 | Zhang et al. | 370/235 |
| 6,996,083 B1 * | 2/2006 | Balachandran et al. | 370/337 |
| 7,010,305 B2 * | 3/2006 | Immonen et al. | 455/452.2 |
| 2001/0031634 A1 * | 10/2001 | Mizutani et al. | 455/425 |

FOREIGN PATENT DOCUMENTS

WO    WO 01/03451 A1    1/2001

* cited by examiner

*Primary Examiner*—Edan Orgad
*Assistant Examiner*—Blanche Wong
(74) *Attorney, Agent, or Firm*—Withrow & Terranova, PLLC

(57) ABSTRACT

The present invention provides an access point, such as a base station, facilitating wireless communications with a plurality of mobile terminals, which are capable of operating in an active or standby mode. The access point provides active-to-standby transition timers for controlling when to instruct active mobile terminals to enter a standby mode after the end of a communication session. The active-to-standby transition timers have variable values based on one or more Quality of Service (QoS) parameters. Different mobile terminals may be associated with different QoS levels. The values for the active-to-standby transition timers may vary based on their respective QoS levels. The initial values for the active-to-standby transition timers may differ depending on the QoS level for the associated mobile terminal. As the QoS parameters indicate conditions adversely affecting QoS, the active-to-standby timer values may decrease in proportion to the QoS parameters.

29 Claims, 4 Drawing Sheets

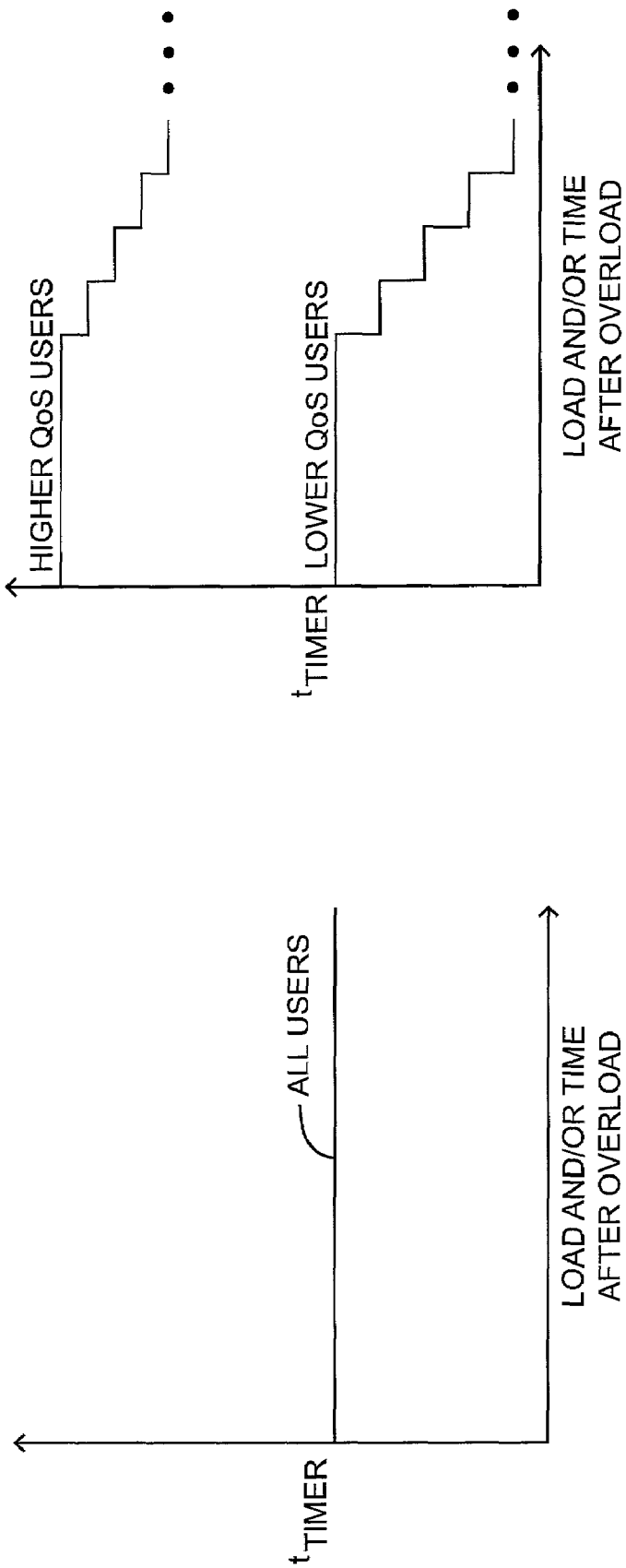

ADAPTIVE STATE TRANSITION CONTROL

FIELD OF THE INVENTION

The present invention relates to wireless communication systems, and in particular, to controlling transitions between active and standby modes for mobile terminals based on QoS requirements.

BACKGROUND OF THE INVENTION

In wireless systems where a common access point, such as a base station, communicates with multiple mobile terminals, there is a need to manage activity of the mobile terminals and allocation of resources. Since many mobile terminals are battery operated, there is a constant effort to minimize power consumption and optimize battery life. Accordingly, the mobile terminals often cycle between an active mode during communication sessions and one or more standby modes between communication sessions. While in a standby mode, the mobile terminals may operate in different ways depending on the communication system. For example, a mobile terminal may power down in standby mode and periodically power up and communicate with the base station to see if a communication session is necessary. When the mobile terminal awakes to see if a communication session is necessary, the mobile terminal is not considered in an active mode, and communicates with the access point only to a limited extent to determine if it should transition to an active mode.

During active modes, communication resources are allocated to facilitate communications between the mobile terminal and the access point. Unfortunately, the access point has limited communication resources and is limited in the number of mobile terminals with which it can communicate at any given time. Given these limitations, access points in current wireless communication systems control the operating mode of the mobile terminals and allocation of communication resources available for communications with the mobile terminals.

The communication resources correspond to the physical layer resources facilitating communication in a given communication medium. The communication resources are managed using a medium access control (MAC) protocol, which is typically a layer two protocol. Communications are effected using a data channel for communicating data traffic and a control channel for communicating control signaling according to the MAC protocol.

FIG. 1 illustrates the basic communication process of existing wireless systems wherein the mobile terminals are transitioned between active and standby modes. The control signaling by the access point controls transitions between the active and standby modes. During an active mode for a given mobile terminal, the access point sets an active-to-standby timer upon completion of either transmitting or receiving a block of data, $T_{SET}$. The active-to-standby timer has a fixed value $t_{TIMER}$, which corresponds to a defined period of time. If new data arrives for communication prior to expiration, the active-to-standby timer is cancelled, $T_{CAN}$, the mobile terminal remains in the active mode, and the data is communicated. Once the data is communicated, the active-to-standby timer is once again set, $T_{SET}$, using the fixed value, $t_{TIMER}$.

If no new data needs to be communicated during the fixed period, the fixed active-to-standby timer expires, $T_{EXP}$, and the access point instructs the mobile terminal to transition into the standby mode. When new data arrives for communication, $T_{DATA}$, the access point instructs the mobile terminal to transition into the active mode. Notably, there is normally a certain amount of time, $t_{TRAN}$, necessary for the mobile terminal to transition into an active mode and for the access point to recognize the mobile terminal is active and to allocate resources for facilitating communications between the mobile terminal and the access point. Once the mobile terminal returns to the active mode and the access point allocates the resources, $T_{ALLOC}$, the new data is communicated and the cycle will repeat as necessary.

As noted, the active-to-standby timer value $t_{TIMER}$ is set as a fixed configuration parameter and does not change dynamically during operation or among mobile terminals. A fixed timer value has proven satisfactory for traditional voice and low speed data systems where all traffic is processed with the same priority and treated equally. In such systems, a best effort approach is applied to all data regardless of type or user. However, higher speed data communications often prioritize certain types of data and users in different ways. For instance, voice or streaming media is prioritized over basic data transfer. Accordingly, a concept of quality of service (QoS) is necessary to control the tolerable transmission delay for data or the acceptable residual error rate.

In a system that delivers multiple levels of QoS, the data should not be treated equally, because the higher QoS users need more chances to communicate than the lower QoS users. The QoS requirements become apparent when the system is busy. If the same active-to-standby timer value $t_{TIMER}$ is equally applied to the higher QoS and the lower QoS users, there are equal chances for both QoS groups to be transitioned from the active mode to the standby mode. Once a user is moved from the active state to the standby state, it usually takes a significant amount of time, $T_{TRAN}$, to transition back to the active mode. As a result, the data requiring a higher QoS is unacceptably delayed, even though the data requiring a lower QoS could tolerate even longer delays than that imposed.

Applying a shorter active-to-standby timer period for systems handling heavy traffic loads often results in urgent traffic suffering from unacceptable delays. These delays are imposed because the mobile terminals are transitioned prematurely into a standby mode and the time to transition back to the active mode is relatively long. Further, the fixed active-to-standby timer period does not allow for prioritizing data and users requiring different QoS levels. Accordingly, there is a need for a way to control the transitioning from an active mode to a standby mode based on QoS requirements.

SUMMARY OF THE INVENTION

The present invention provides an access point, such as a base station, facilitating wireless communications with a plurality of mobile terminals, which are capable of operating in an active or standby mode. The access point provides active-to-standby transition timers for controlling when to instruct active mobile terminals to enter a standby mode after the end of a communication session. The active-to-standby transition timers have variable values based on one or more Quality of Service (QoS) parameters. Different mobile terminals may be associated with different QoS levels. The values for the active-to-standby transition timers may vary based on their respective QoS levels. The initial values for the active-to-standby transition timers may differ depending on the QoS level for the associated mobile terminal. As the QoS parameters indicate conditions adversely affecting QoS, the active-to-standby timer values may decrease in proportion to the QoS parameters.

Further, the values for the active-to-standby timers associated with the different QoS levels may be decreased at different rates. Preferably, the values for active-to-standby transition timers associated with higher QoS levels are decreased at rates less than those associated with lower QoS levels. When conditions that adversely affect QoS persist, the access point can block mobile terminals operating in a standby mode from transitioning to an active mode as well as transition active mobile terminals to which there are no data to communicate to a standby mode.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 4A and 4B are graphs illustrating control of an active-to-standby timer according to the prior and one embodiment of the present invention, respectively.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
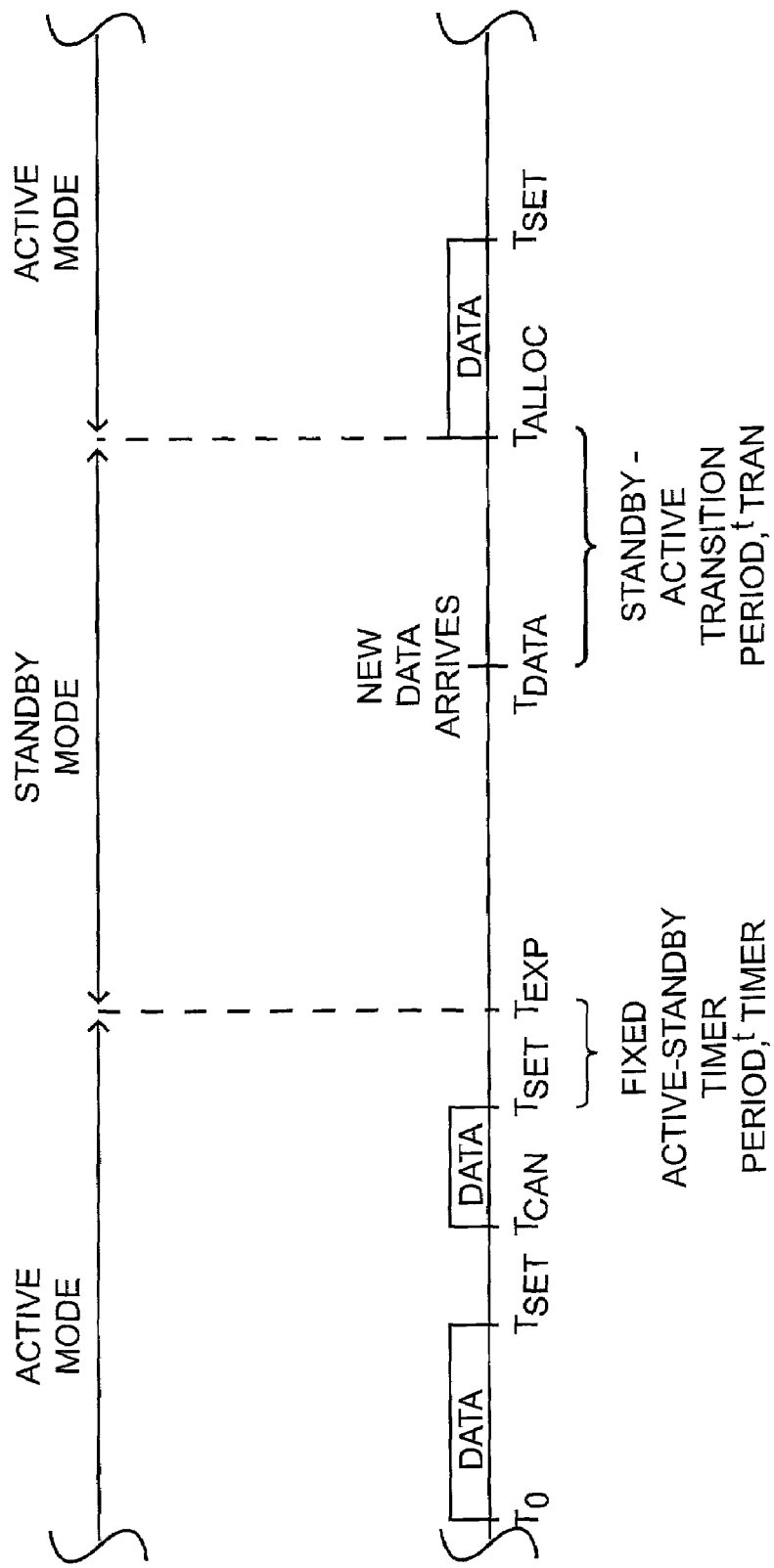
FIG. 1 illustrates physical layer control associated with a mobile terminal according to the prior art.
Figure 2:
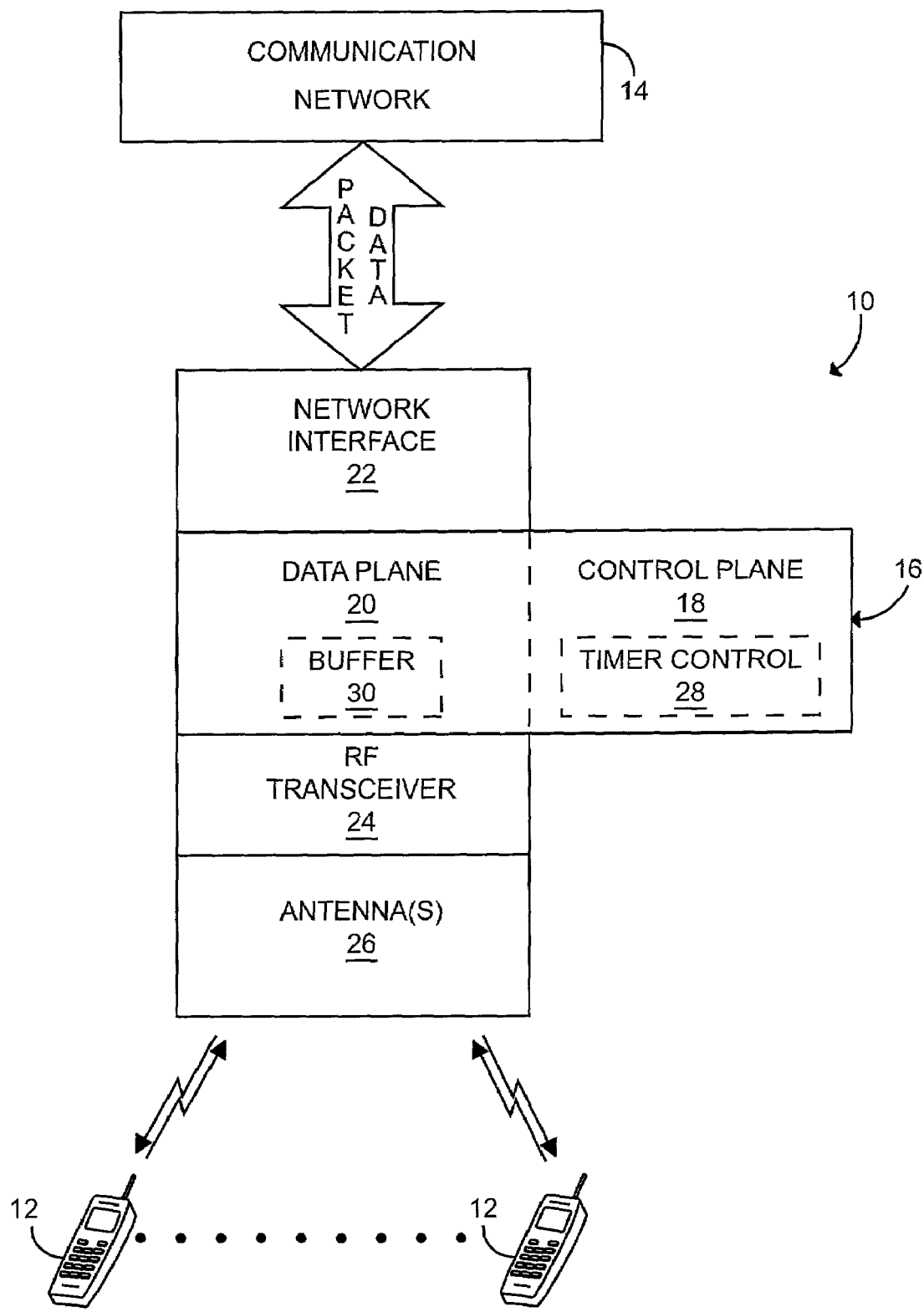
FIG. 2 is a block representation of a wireless communication environment according to one embodiment of the present invention.

Reference is now made to FIG. 2. Wireless networks use access points, such as base stations 10, to facilitate communications with access terminals, such as mobile terminals 12, within a select coverage area, or cell. Respective groups of base stations 10 are supported by a communication network 14, which may include mobile switching centers, a public switched telephone network (PSTN), a packet-switched network, or a combination thereof. The communication network 14 is used to transport data in the form of packets to and from the base station 10. The packets may be communicated in a direct packet-switched manner or on top of a circuit-switched platform. The manner in which the packets are communicated to the base station 10 is not critical to the invention.

During downlink communications from the base station 10 to select mobile terminals 12, the base station 10 must determine the manner and order in which to transmit the data received in the packets from the communication network 14 to the mobile terminals 12. Further, the base station 10 will effectively control allocation of resources necessary to facilitate communications amongst the mobile terminals 12 and instruct the mobile terminals 12 when to transition between an active and one or more standby modes.

Accordingly, the base station 10 will include a control system 16 having a control plane 18 controlling the flow of data through a data plane 20, allocation of resources, and the operating mode of the mobile terminals 12. For transmissions to the mobile terminals 12, the data plane 20 will process packets received from the communication network 14 via a network interface 22 under the control of the control plane 18. The packets are processed into units, which are delivered to radio frequency (RF) transceiver circuitry 24 for transmission via the antennas 26 once communication resources are allocated, the appropriate mobile terminal 12 is operating in an active mode, and the unit is scheduled to be transmitted. For transmissions to the base station 10, units modulated in signals received at the antenna 26 are recovered via the RF transceiver 24 and processed by the data plane 20 under the control of the control plane 18. The recovered units are then forwarded, as necessary, over the communication network 14 via the network interface 22.

For the sake of clarity, the term "packet" refers to packetized data, which is received by the base station 10 from the communication network 14. The term "unit" refers to packetized data that is transmitted from the base station 10 to the mobile terminals 12. A unit may include all or any part of one or more packets. Although units may directly correspond to packets, units are preferably a given size wherein packets may vary in size from one packet to another. The units may include voice or traditional data intended to be communicated at any data rate, alone or in conjunction with control information used to control the mobile terminal 12 or communications therewith.

The forward link from the base station 10 to the mobile terminal 12 will include one or more channels, which are divided into defined time slots. The RF transceiver circuitry 24 is configured to modulate a given unit as dictated by the control plane 18 and transmit the modulated unit via one or more antennas 26 during a single time slot. The RF transceiver circuitry 24 is preferably configured to implement different modulation and coding techniques and speeds based on channel conditions, the capabilities of the mobile terminals 12, or required transmission standards. Those skilled in the art will recognize the various possible modulation techniques and that multiple units may be transmitted in a given time slot. Further, different channels may be allocated for data and control signaling.

The control plane 18 includes a scheduler and a medium access control (MAC) application, which includes an active-to-standby timer control function 28. The scheduler is configured to control delivery of units to the mobile terminals 12 based on scheduling requirements. During operation, packets for any number of mobile terminals 12 are received and stored in a buffer 30 associated with the data plane 20. The buffer 30 is segregated into multiple queues, each associated with a given mobile terminal 12. If the packets do not directly correspond to units, the incoming packets are processed into the desired units. The units are stored in the respective queues in the order in which they are received. Preferably, the queues use a first-in-first-out (FIFO) configuration.

Unfortunately, the base station 10 has limited communication resources and is limited in the number of mobile terminals 12 with which it can communicate at any given time. Thus, in addition to scheduling, the base station 10 must control the operating mode of the mobile terminals 12 and allocate communication resources for communications with the mobile terminals 12. In addition to managing communication capacity, the mobile terminals 12 are also instructed to enter a standby mode to manage power consumption.

The allocable communication resources typically correspond to the physical layer resources facilitating communication in a given communication medium. The communication resources are managed using a MAC protocol, which is typically a layer two protocol, implemented in the control plane 18. Communications are effected using a data channel for communicating data traffic and a control channel for communicating control signaling according to the MAC protocol.

Figure 3:
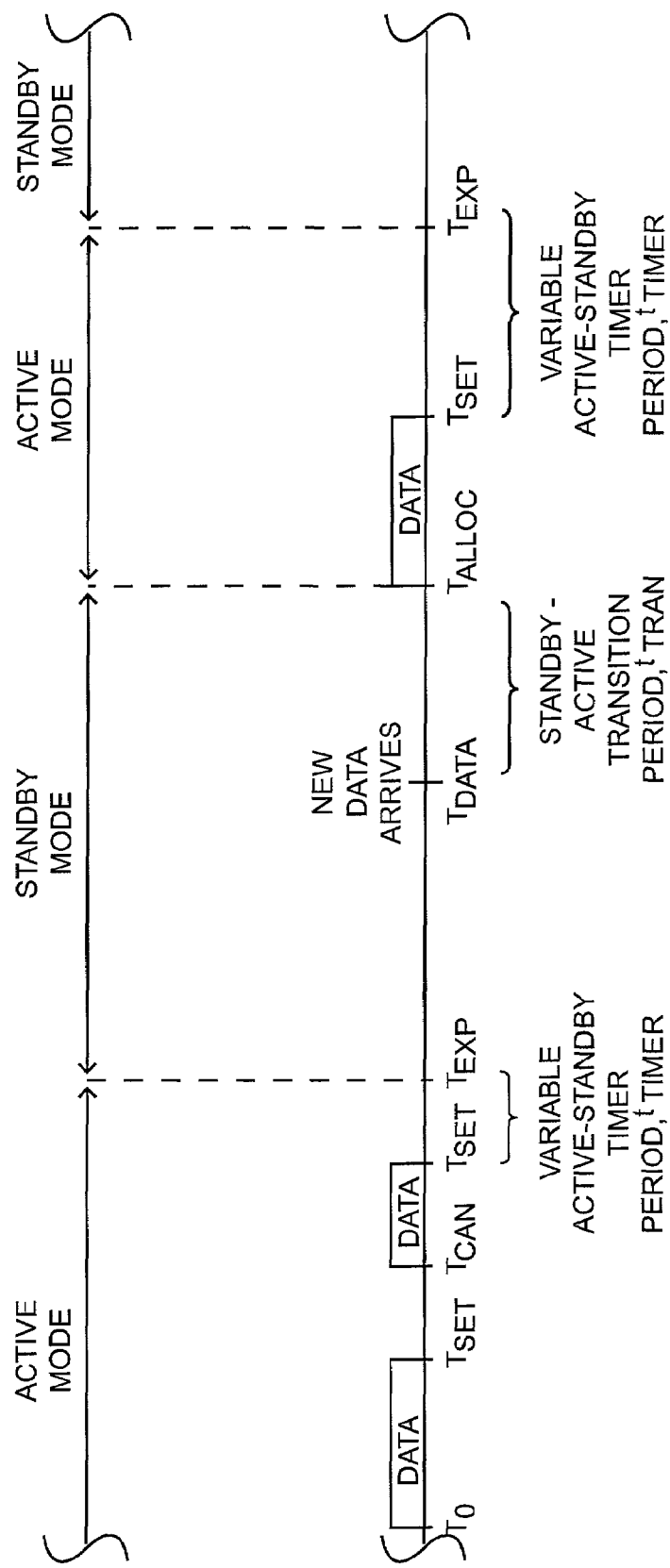
FIG. 3 illustrates physical layer control associated with a mobile terminal according to the one embodiment of the present invention.

FIG. 3 illustrates the basic communication process of present invention wherein the mobile terminals 12 are transitioned between active and standby modes under control of the base station 10. In addition to managing communication resources and the number of active mobile terminals, the base station 10 may control the active and standby modes in a manner minimizing power consumption and maximizing battery life for the mobile terminals 12.

The control signaling of the base station 10 controls transitions between the active and standby modes. During an active mode for a given mobile terminal 12, the timer control function 28 in the control plane 18 sets an active-to-standby timer, $T_{SET}$, for each participating mobile terminal 12 upon completion of either transmitting or receiving a block of units, referred to in general as data. Importantly, the active-to-standby timer has a variable value, $t_{TIMER}$. If new data arrive for communication prior to the timer expiring, the active-to-standby timer is cancelled, $T_{CAN}$, the mobile terminal 12 remains in the active mode, and the data is communicated. Once the data is communicated, the active-to-standby timer is once again set, $T_{SET}$.

If no new data needs communicated during the period defined by the active-to-standby timer value $t_{TIMER}$, the timer expires, $T_{EXP}$, and the base station 10 instructs the mobile terminal 12 to transition into the standby mode. When new data arrives for communication, $T_{DATA}$, the base station instructs the mobile terminal 12 to transition into the active mode. Notably, there is normally a certain amount of time, $t_{TRAN}$, necessary for the mobile terminal 12 to transition into an active mode, for the base station 10 to recognize the mobile terminal 12 is active, and for the base station 10 to allocate resources for facilitating communications between the mobile terminal 12 and the base station 10. Once the mobile terminal 12 returns to the active mode and the base station 10 allocates the resources, $T_{ALLOC}$, the new data may be communicated and the cycle will repeat.

In contrast to existing state control techniques, the active-to-standby timer value $t_{TIMER}$ of the present invention is variable and can change dynamically during operation to achieve a desired Quality of Service (QoS) based on any number of system and operational conditions. The active-to-standby timer value $t_{TIMER}$ can vary between mobile terminals 12 as well as for any given mobile terminal 12 over time. The active-to-standby timer value $t_{TIMER}$ can be a function of any number of variables affecting QoS, such as the requisite QoS associated with data or applications, the QoS associated with the mobile terminal 12 or user thereof, the number of active mobile terminals 12, the communication load, or any combination thereof. Those skilled in the art will recognize additional QoS parameters.

QoS is typically degraded when communication resources are in short supply, when there are too many active mobile terminals 12 for the base station 10 to service, or a combination thereof. Further, QoS is relative because different users of mobile terminals 12 may require different QoS levels. Accordingly, when data traffic is low and the number of active mobile terminals is well within the base station's capacity, QoS concerns are at a minimum and the active-to-standby timer value $t_{TIMER}$ can be relatively constant for each mobile terminal 12. Preferably, the relatively constant active-to-standby timer values $t_{TIMER}$ are different among different groups of users based on QoS requirements.

When overall data traffic is relatively low, but the number of active mobile terminals 12 is too high, QoS can be compromised. In response to such a condition, the present invention can reduce the active-to-standby timer values $t_{TIMER}$ for the active mobile terminals 12. Preferably, the active-to-standby timer values $t_{TIMER}$ for mobile terminals 12 associated with a lower QoS are reduced relatively more than for those associated with a higher QoS. Further, the active-to-standby timer values $t_{TIMER}$ may be continuously or periodically reduced even further as the overload conditions increase or remain.

Reference is directed to FIG. 4A, wherein a fixed active-to-standby timer values $t_{TIMER}$ remain intact regardless of conditions and FIG. 4B, wherein the active-to-standby timer values $t_{TIMER}$ are variable as QoS conditions degrade or after an overload condition occurs. In FIG. 4B, different users have different QoS requirements and different default active-to-standby timer values $t_{TIMER}$. As illustrated, the rates of decrease for the active-to-standby timer values $t_{TIMER}$ for the different groups differ. As such, the active-to-standby timer values $t_{TIMER}$ for the higher QoS users start at a higher value and decrease less than those for the lower QoS users.

In addition to reducing the active-to-standby timer values $t_{TIMER}$ during lower traffic conditions when the number of active mobile terminals 12 is too high, other measures may be taken to reduce the number of active mobile terminals 12. First, the base station 10 may instruct active mobile terminals 12 to which there is no data available to transmit to transition into a standby mode. Since data is normally buffered in a queue of buffer 30 prior to transmission, the base station 10 may identify active mobile terminals 12 that are associated with an empty queue and instruct them to enter a standby mode. Again, mobile terminals 12 associated with a lower QoS may be instructed to enter a standby mode faster than those associated with a higher QoS. Second, the base station 10 can block transitions to an active mode for mobile terminals 12 in a standby mode. Such blocking may be more stringent and remain in effect longer for mobile terminals 12 associated with a lower QoS.

Another condition impacting QoS occurs when the number of active mobile terminals 12 is within the base station's capability, yet the amount of traffic is overloading the system. In this situation, the active-to-standby timer values $t_{TIMER}$ are reduced, wherein the active-to-standby timer values $t_{TIMER}$ associated with mobile terminals 12 requiring a lower QoS are reduced faster and proportionally more than those associated with a higher QoS. Further, the base station 10 can block standby-to-active transitions, preferably in a manner prioritizing mobile terminals 12 having higher QoS requirements. Thus, active mobile terminals 12 associated with a higher QoS will benefit from the earlier blocking of transitions to an active mode for mobile terminals 12 associated with a lower QoS. When there are too many users and too much traffic, the above steps are beneficial in resolving the condition as well as prioritizing users with higher QoS requirements over those with lower QoS requirements.

As indicated, the active-to-standby timer values $t_{TIMER}$ can have different initial values based on QoS requirements and may be decreased at different rates. The timing and rate of decrease may be based on the amount of time an overload condition remains, the extent of the overload condition, the type of overload condition, or a combination thereof. Preferably, the initial active-to-standby timer values $t_{TIMER}$ remain constant until a predefined threshold time or overload condition is reached. At the threshold, the active-to-standby timer values $t_{TIMER}$ may be continuously or periodically decreased until the condition subsides. Further, the base station 10 may continually adjust the active-to-standby timer values $t_{TIMER}$ by increasing or decreasing values in a dynamic fashion based on conditions and/or the number of active mobile terminals 12. Alternatively, the base station 10 may simply return to the initial active-to-standby timer values $t_{TIMER}$ once the condition passes. The modification of the active-to-standby timer values $t_{TIMER}$ may be supplemented by any number of measures, such as blocking active transitions, transitioning active mobile terminals that are not actively communicating, and the like. Preferably, each of these supplemental measures is applied in proportion to QoS requirements.

Those skilled in the art will recognize improvements and modifications to the preferred embodiments of the present invention. All such improvements and modifications are considered within the scope of the concepts disclosed herein and the claims that follow. Further, the access points or mobile terminals 12 may take many forms, including telephones, personal digital assistants, computers, and the like.

What is claimed is:

1. A method for controlling active-to-standby transitions for mobile terminals in a wireless communication environment, the method comprising:
    a) monitoring at least one Quality of Service (QoS) parameter bearing on QoS;
    b) determining a first value for an active-to-standby transition timer for a first mobile terminal based on the at least one QoS parameter;
    c) setting the active-to-standby transition timer for the first mobile terminal with the first value at the end of a data communication session with the first mobile terminal; and
    d) instructing the first mobile terminal to transition from an active mode to a standby mode if another communication session is not necessary prior to expiration of the active-to-standby transition timer for the first mobile terminal, the first value for the active-to-standby transition timer for the first mobile terminal being variable based on the at least one QoS parameter.

2. The method of claim 1 wherein the first value decreases as the at least one QoS parameter changes in a manner adversely affecting QoS.

3. The method of claim 2 wherein the first value has an initial value and is decreased after the at least one QoS parameter passes a predefined threshold.

4. The method of claim 1 wherein the at least one QoS parameter consists of a number of active mobile terminals, an amount of communication traffic, system overload, time after system overload, and a combination thereof.

5. The method of claim 1 further comprising:
    a) determining a second value for an active-to-standby transition timer for a second mobile terminal based on the at least one Quality of Service (QoS) parameter;
    b) setting the active-to-standby transition timer for the second mobile terminal with the second value at the end of a data communication session with the second mobile terminal; and
    c) instructing the second mobile terminal to transition from an active mode to a standby mode if another communication session is not necessary prior to expiration of the active-to-standby transition timer for the second mobile terminal, the second value for the active-to-standby transition timer for the second mobile terminal being variable based on the at least one QoS parameter.

6. The method of claim 5 wherein the first and second values decrease as the at least one QoS parameter changes in a manner adversely affecting QoS.

7. The method of claim 6 wherein the first value decreases at a lower rate than the second value as the at least one QoS parameter changes in a manner adversely affecting QoS.

8. The method of claim 7 wherein the first value has a higher initial value than the second value.

9. The method of claim 8 wherein the initial values for the first and second values decrease after the at least one QoS parameter passes a predefined threshold.

10. The method of claim 5 wherein the first mobile terminal is associated with a first QoS level and the second mobile terminal is associated with a second QoS level.

11. The method of claim 10 wherein the first value is applied to active-to-standby transition timers for a plurality of mobile terminals and the second value is applied to active-to-standby transition timers for a plurality of mobile terminals.

12. The method of claim 5 further comprising blocking standby-to-active transitions for mobile terminals in the standby mode based on the at least one QoS parameter.

13. The method of claim 5 further comprising instructing active mobile terminals to transition to the standby mode based on the at least one QoS parameter when no data needs to be communicated in association with the active mobile terminals.

14. A method comprising:
    a) monitoring at least one Quality of Service (QoS) parameter bearing on QoS;
    b) determining a first value for active-to-standby transition timers for active mobile terminals associated with a first QoS level and a second value for active-to-standby transition timers for active mobile terminals associated with a second QoS level, the first and second values based on the at least one QoS parameter;
    c) setting the active-to-standby transition timers for the mobile terminals associated with the first QoS level with the first value and setting the active-to-standby transition timers for the mobile terminals associated with the second QoS level with the second value at the end of a data communication sessions; and
    d) instructing each mobile terminal to transition from an active mode to a standby mode if another communication session is not necessary prior to expiration of the corresponding active-to-standby transition timer.

15. The method of claim 14 wherein the first value decreases at a lower rate than the second value as the at least one QoS parameter changes in a manner adversely affecting QoS.

16. The method of claim 15 wherein the first value has a higher initial value than the second value.

17. An access point comprising:
    a) a wireless communication interface adapted to facilitate wireless communications with mobile terminals; and b) a control system associated with the wireless communication interface and adapted to:
  i) monitor at least one Quality of Service (QoS) parameter bearing on QoS;
  ii) determine a first value for an active-to-standby transition timer for a first mobile terminal based on the at least one QoS parameter;
  iii) set the active-standby transition timer for the first mobile terminal with the first value at the end of a data communication session with the first mobile terminal; and
  iv) instruct the first mobile terminal to transition from an active mode to a standby mode if another communication session is not necessary prior to expiration of the active-to-standby transition timer for the first mobile terminal, the first value for the active-to-standby transition timer for the first mobile terminal being variable based on the at least one QoS parameter.

18. The access point of claim 17 wherein the first value decreases as the at least one QoS parameter changes in a manner adversely affecting QoS.

19. The access point of claim 18 wherein the first value has an initial value and is decreased after the at least one QoS parameter passes a predefined threshold.

20. The access point of claim 17 wherein the at least one QoS parameter consists of a number of active mobile terminals, an amount of communication traffic, system overload, time after system overload, and a combination thereof.

21. The access point of claim 17 wherein the control system is further adapted to:
  a) determine a second value for an active-to-standby transition timer for a second mobile terminal based on the at least one QoS parameter;
  b) set the active-to-standby transition timer for the second mobile terminal with the second value at the end of a data communication session with the second mobile terminal; and
  c) instruct the second mobile terminal to transition from an active mode to a standby mode if another communication session is not necessary prior to expiration of the active-to-standby transition timer for the second mobile terminal, the second value for the active-to-standby transition timer for the second mobile terminal being variable based on the at least one QoS parameter.

22. The access point of claim 21 wherein the first and second values decrease as the at least one QoS parameter changes in a manner adversely affecting QoS.

23. The access point of claim 22 wherein the first value decreases at a lower rate than the second value as the at least one QoS parameter changes in a manner adversely affecting QoS.

24. The access point of claim 23 wherein the first value has a higher initial value than the second value.

25. The access point of claim 24 wherein the initial values for the first and second values decrease after the at least one QoS parameter passes a predefined threshold.

26. The access point of claim 21 wherein the first mobile terminal is associated with a first QoS level and the second mobile terminal is associated with a second QoS level.

27. The access point of claim 26 wherein the first value is applied to active-to-standby transition timers for a plurality of mobile terminals and the second value is applied to active-to-standby transition timers for a plurality of mobile terminals.

28. The access point of claim 21 wherein the control system is further adapted to block standby-to-active transitions for mobile terminals in the standby mode based on the at least one QoS parameter.

29. The access point of claim 21 wherein the control system is further adapted to instruct active mobile terminals to transition to the standby mode based on the at least one QoS parameter when no data needs to be communicated in association with the active mobile terminal.

* * * * *